Aug. 5, 1941.  C. V. MANGLE  2,251,593
FISH LURE
Filed April 11, 1941
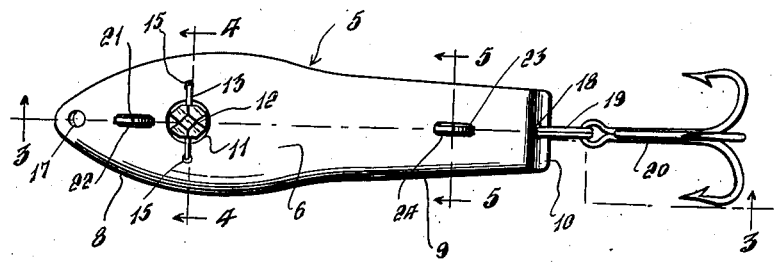
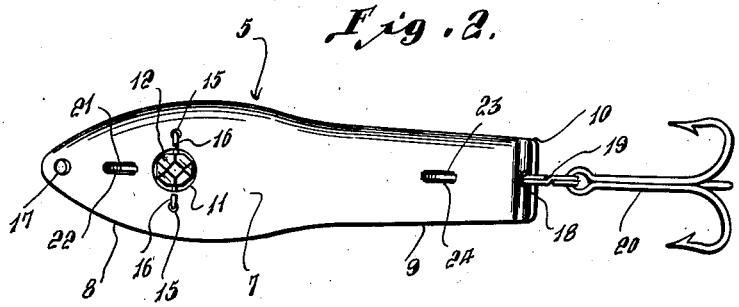
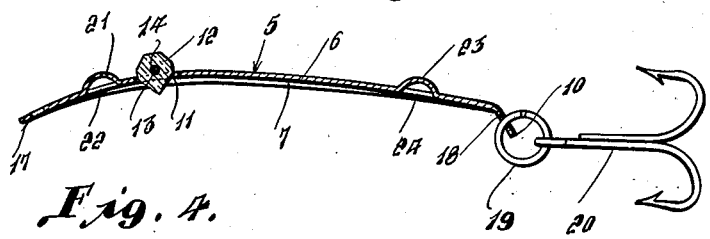
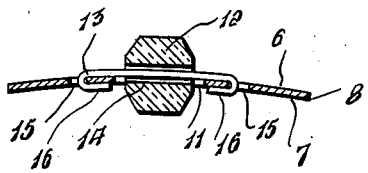
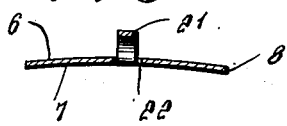

Patented Aug. 5, 1941

2,251,593

UNITED STATES PATENT OFFICE 2,251,593

FISH LURE

Claude V. Mangle, Livermore, Iowa

Application April 11, 1941, Serial No. 388,170

1 Claim. (Cl. 43—45)

The present invention relates to improvements in fish lures.

The primary purpose of the invention is to provide a fish lure which will produce a series of movements when drawn through the water to simulate the movements of a bait.

A further object and purpose of the invention is to provide an artificial bait which will produce minute sounds when drawn through the water as a result of a vibrating part carried by the bait in the form of an eye representation.

A still further object of the invention is to provide an artificial fish lure in the form of a metal spoon having stamped portions at the front and rear thereof to provide eyelets to facilitate attachment of the leader line.

A still further object of the invention is to provide an artificial fish lure, the tail portion of which is bent angularly to cause the spoon to swerve and be displaced from its vector movement.

Other objects and advantages of the invention will become apparent during the course of the following description of the accompanying drawing, wherein, Figure 1 is a top plan view of the fish lure embodying the invention;

Figure 2 is a bottom plan view illustrating in detail, the manner in which the line attaching eyelets are stamped upwardly;

Figure 3 is a longitudinal cross-sectional view taken on line 3—3 of Figure 1, looking in the direction of the arrows, illustrating the general contour of the fish lure;

Figure 4 is a vertical transverse cross-sectional view taken on line 4—4 of Figure 1, looking in the direction of the arrows, illustrating in detail the manner in which the vibrating eye is attached to the spoon; and Figure 5 is a vertical transverse cross-sectional view taken on line 5—5 of Figure 1, looking in the direction of the arrows, illustrating the specific construction of the line attaching loop or eyelet.

In the drawing, wherein for the purpose of illustrating the invention and wherein like reference characters will be employed to designate like parts throughout the same, the reference character 5 will generally be employed to designate a fishing spoon formed of metal, having a convex top wall 6 and a concave bottom wall 7. The fishing lure spoon is piscus-shaped and is provided with a head portion 8 which gradually decreases in magnitude toward the end tail portion 9 and terminates in an angularly bent end wall 10.

The head portion 8 is provided with a circular opening 11 in which is mounted a vibrating jewel 12 representing an eye and said jewel is provided with a retaining wire 13 which extends through a central opening in the jewel, as at 14, so that the free ends of the wire 13 may be passed through diametrically opposed apertures 15 and return bent as at 16 to thereby securely hold the jewel 12 in place.

It is to be noted that the opening 11 is slightly larger in diameter than the jewel 12 so that the jewel may vibrate back and forth on the retaining wire 13 and in so doing create a vibratory sound.

An opening 17 is formed in the forward end of the head portion 8 and an opening 18 is formed in the angular wall 10 for the purpose of receiving a line and hook respectively. A ring 19 is passed through the opening 18 and carries a conventional hook 20.

Formed between the vibrating jewel 12 and the opening 17 is a struck-up eye member 21 which is produced by forming a pair of parallel slots in the metal and then striking or stamping the metal between the slots to force the metal upwardly, and in so doing, an opening 22 is formed under the eye 21.

Similarly, an eye 23 is formed in the rear portion of the spoon and is produced in exactly the same manner, such as by cutting parallel slots in the tail portion and striking or punching up the metal in between the slots, leaving a resultant opening in the metal under the eyelet, as at 24.

A swivel line may be connected to the eyelet 21 so that the fish lure will be drawn through the water head first and by reason of the shape of the spoon, the artificial bait will be displaced in a number of different directions from its normal path or vector.

Similarly, a leader line may be connected to the struck-up eyelet 23 and the fish spoon drawn through the water tail first to produce a series of different actions. By connecting a leader line to both struck-up eyelets 21 and 23 so that the free ends converge and form an oblique triangle, a still further action may be produced, such as a diving and darting movement by the displacement of the fish lure in a series of resultant vectors.

It is obvious that a fish line leader may be connected to the up-struck eyelets 21 and 23, so as to give the desired action and to change the actions to suit the specific needs of the fisherman.

It is to be understood that the form of the invention herein shown and described is to be taken as the preferred embodiment of the same, and that various changes in the shape, size and arrangement of parts may be resorted to without departing from the spirit and scope of the invention as claimed.

I claim:

A trolling spoon comprising an elongated concavo-convex body member having a head section and a tail section, a vibratory member associated with the head section to produce minute sounds, a deflecting vane carried by the tail section, and a struck-up metal eyelet formed in the head section and tail section for alternately being attached to a leader line.

CLAUDE V. MANGLE.